US012743121B2

(12) United States Patent
Tsien et al.

(10) Patent No.: US 12,743,121 B2
(45) Date of Patent: Sep. 22, 2026

(54) SEGMENT CLOCK GATING

(71) Applicant: Advanced Micro Devices, Inc., Santa Clara, CA (US)

(72) Inventors: Benjamin Tsien, Santa Clara, CA (US); Pravesh Gupta, Bangalore (IN); Madhusudan Chilakam, Boxborough, MA (US); Jeffrey Lynn Freeman, Austin, TX (US); Indrani Paul, Austin, TX (US); Guhan Krishnan, Boxborough, MA (US); Ann M. Ling, Santa Clara, CA (US); Chandana Yerneni, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 27 days.

(21) Appl. No.: 18/399,655

(22) Filed: Dec. 28, 2023

(65) Prior Publication Data

US 2025/0216889 A1 Jul. 3, 2025

(51) Int. Cl.
*G06F 1/10* (2006.01)
*G06F 1/06* (2006.01)
*G06F 1/3237* (2019.01)

(52) U.S. Cl.
CPC .................. *G06F 1/10* (2013.01); *G06F 1/06* (2013.01); *G06F 1/3237* (2013.01)

(58) Field of Classification Search
CPC ........................................................ G06F 1/10
USPC ........................................................ 327/291
See application file for complete search history.

(56) References Cited

U.S. PATENT DOCUMENTS 8,769,332 B2 * 7/2014 Ziesler ...................... G06F 1/10 713/322
10,796,066 B1 10/2020 Farshidi et al.
10,936,040 B2 * 3/2021 Lim ........................ G06F 1/324
2006/0156043 A1 * 7/2006 Liu ...................... G06F 1/3287 713/300
2006/0220722 A1 * 10/2006 Komura .................... G06F 1/10 327/291
2007/0005995 A1 * 1/2007 Kardach ................. G06F 1/325 713/300
2011/0115567 A1 * 5/2011 Sutardja .................. G06F 21/50 331/34
2015/0168992 A1 6/2015 Choi
2015/0326225 A1 * 11/2015 Kato .................. H03K 19/0016 326/83
2018/0217657 A1 * 8/2018 Song ..................... H04L 7/0331
2018/0329471 A1 * 11/2018 Venkatasubramanian .................. G06F 1/3237
2019/0204864 A1 * 7/2019 Bailey ...................... G06F 1/10

(Continued)

OTHER PUBLICATIONS

International Search Report and Written Opinion in PCT Application No. PCT/US2024/033887 mailed Oct. 11, 2024, By: Authorized Officer: Jeong Rok Yang (7 Pages).

*Primary Examiner* — Tomi Skibinski
(74) *Attorney, Agent, or Firm* — Greenberg Traurig, LLP

(57) ABSTRACT

The disclosed device includes various circuit blocks and a clock tree for sending a clock signal to the circuit blocks. The clock tree includes various clock drivers. The device also includes a control circuit that power gates, in response to one of the circuit blocks being power gated, a portion of the clock tree that includes one of the clock drivers. Various other methods, systems, and computer-readable media are also disclosed.

20 Claims, 5 Drawing Sheets

(56) References Cited

U.S. PATENT DOCUMENTS

2019/0354300 A1 11/2019 Benisty et al.

* cited by examiner

200

SEGMENT CLOCK GATING

BACKGROUND

With increasing complexity of computing devices along with increased demand for performance, power management is increasingly important for meeting performance demands. In addition, certain devices such as mobile devices that run on battery can have additional limitations on power management. Power gating techniques can save power by shutting off power supplies to components or blocks of components. Clock gating techniques can also save power by removing a clock signal for components not in use. However, a clock tree (e.g., a clock distribution network including a clock circuit for generating a clock signal and additional components for sending/modifying the clock signal to appropriate destinations) can still consume significant power despite such techniques.

BRIEF DESCRIPTION OF THE DRAWINGS

The accompanying drawings illustrate a number of exemplary implementations and are a part of the specification. Together with the following description, these drawings demonstrate and explain various principles of the present disclosure.

Figure 1:
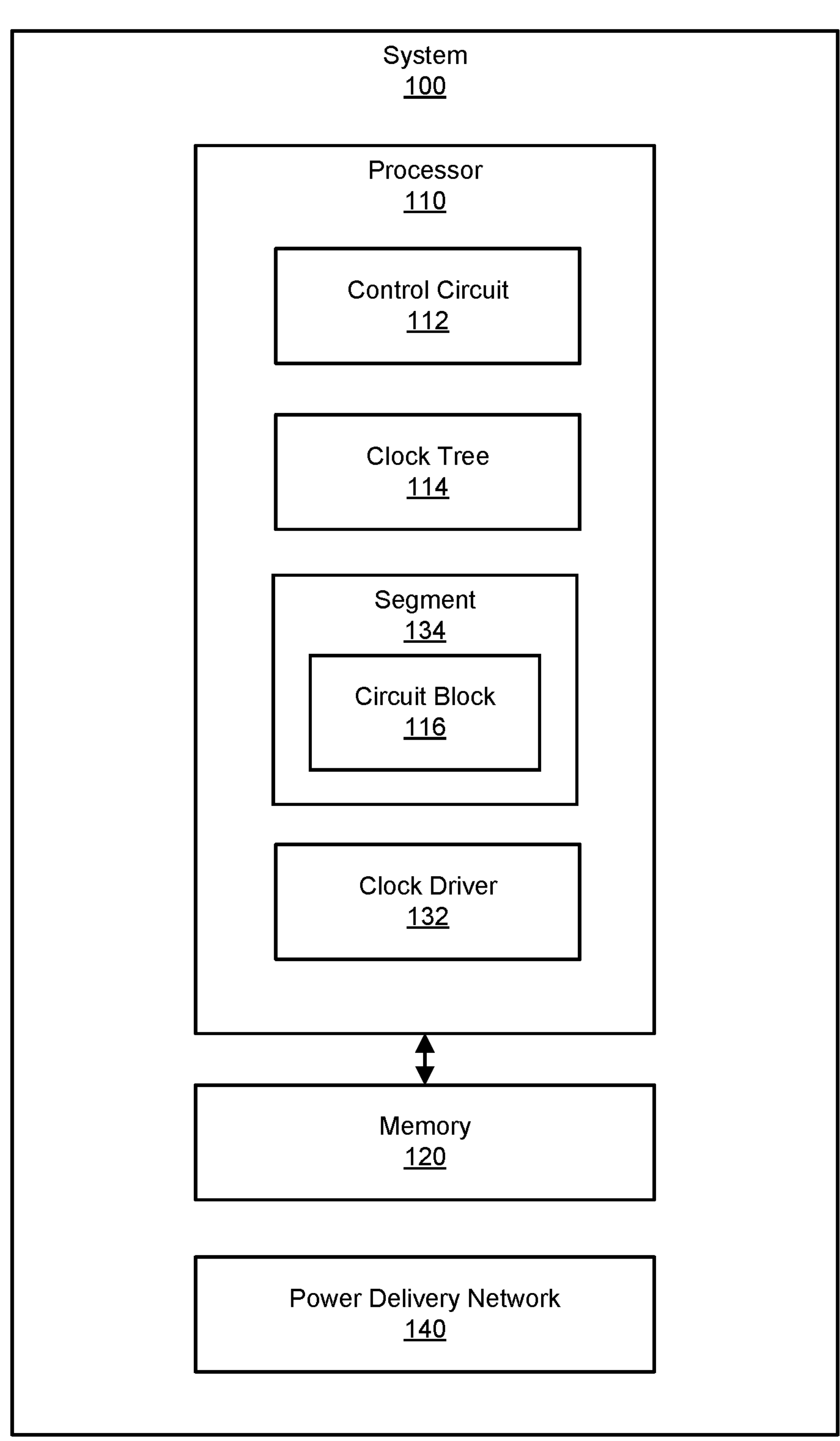
FIG. 1 is a block diagram of an exemplary system for segment clock gating.

Throughout the drawings, identical reference characters and descriptions indicate similar, but not necessarily identical, elements. While the exemplary implementations described herein are susceptible to various modifications and alternative forms, specific implementations have been shown by way of example in the drawings and will be described in detail herein. However, the exemplary implementations described herein are not intended to be limited to the particular forms disclosed. Rather, the present disclosure covers all modifications, equivalents, and alternatives falling within the scope of the appended claims.

DETAILED DESCRIPTION

The present disclosure is generally directed to segment clock gating. As will be explained in greater detail below, implementations of the present disclosure can perform segment clock gating by powering down clock driver of a clock tree to stop clock propagation in segments of the clock tree that are downstream of the powered off clock driver. The clock tree can be organized into a hierarchy of segments, with more powered on segments being segment clock gated after dependent segments, and powered back on in a reverse order. By powering off the clock drivers, additional power savings can be realized beyond power gating logic (e.g., combinatorial and/or sequential logic) and memory (e.g., on-die memory such as SRAM, DRAM, flash, and/or other storage arrays) in segments. In addition, powering off clock drivers based on the hierarchy of segments and corresponding sequence allows powering on the clock drivers in a reverse sequence that can coordinate with powering on logic and memory in segments (e.g., by propagating a free-running clock from portions of the clock tree that remained powered on).

In one implementation, a device for segment clock gating includes a clock tree configured to send a clock signal to a plurality of circuit blocks, and a control circuit configured to power off the clock driver.

In some examples, a circuit block of the plurality of circuit blocks is power gated and the control circuit is further configured to power on the clock driver to enable the power gated circuit block being powered on. In some examples, the control circuit is further configured to power on the clock driver in response to a wakeup event received by the control circuit. In some examples, the wakeup event corresponds to a second circuit block interfacing with the circuit block. In some examples, the wakeup event is part of a daisy chain of wakeup events from multiple circuit blocks of the plurality of circuit blocks.

In some examples, the wakeup event corresponds to a temporary exit of powering off the clock driver. In some examples, the temporary exit corresponds to a register access of the circuit block and the control circuit is further configured to power off the clock driver in response to the register access completing and the circuit block being power gated.

In some examples, the wakeup event corresponds to a partial power state. In some examples, the partial power state corresponds to the circuit block exiting power gating and the clock driver is powered on while other circuit blocks remain power gated.

In one implementation, a system for segment clock gating includes a plurality of segments each comprising circuit blocks, a plurality of clock drivers each configured to drive a clock signal to a respective segment of the plurality of segments, and a control circuit configured to power gate a segment of the plurality of segments and power off a corresponding clock driver of the plurality of clock drivers associated with the power gated segment.

In some examples, the system further includes a plurality of power gate circuits for power gating the plurality of segments. In some examples, a hierarchy of the plurality of clock drivers corresponds to a dependency of driving the clock signal between clock drivers of the plurality of clock drivers. In some examples, the system further includes a clock generator corresponding to a root of the hierarchy of the plurality of clock drivers.

In some examples, the hierarchy of the plurality of clock drivers corresponds to a sequence from a most-gated clock driver to a least-gated clock driver such that a less-gated clock driver is configured to drive the clock signal to a more-gated clock driver. In some examples, the control circuit is further configured to power off one or more of the plurality of clock drivers based on the sequence. In some examples, the control circuit is further configured to power on, in response to a wakeup event, one or more of the plurality of clock drivers based on a sequence from the least-gated clock driver to the most-gated clock driver (e.g., a reverse of the sequence from the most-gated clock driver to the least-gated clock driver) and to exit power gating, in response to the wakeup event, of one or more of the plurality of segments based on the sequence from the least-gated clock driver to the most-gated clock driver.

In some examples, the control circuit is further configured to receive a wakeup event that targets multiple segments of the plurality of segments, and asynchronously propagate the wakeup event to the targeted segments. In some examples, the control circuit is configured to (i) power on, in response to a wakeup event corresponding to a temporary exit, the clock driver, (ii) exit power gating of the segment, (iii) power gate the segment in response to a temporary exit condition elapsing, and (iv) power off the clock driver.

In one implementation, a method for segment clock gating includes (i) power gating, in response to a power gate event, one or more circuit blocks, (ii) powering off a clock driver of a segment corresponding to the one or more circuit blocks, (iii) powering on, in response to a wakeup event, the clock driver, and (iv) exiting power gating in the one or more circuit blocks.

In some examples, exiting power gating in the one or more circuit blocks further includes waiting for a clock signal driven by the clock driver to resume before exiting power gating in the segment. In some examples, the wakeup event is propagated asynchronously with respect to the one or more circuit blocks.

Features from any of the implementations described herein can be used in combination with one another in accordance with the general principles described herein. These and other implementations, features, and advantages will be more fully understood upon reading the following detailed description in conjunction with the accompanying drawings and claims.

The following will provide, with reference to FIGS. 1-4, detailed descriptions of segment clock gating. Detailed descriptions of example systems will be provided in connection with FIGS. 1, 2A-2B, and 3. Detailed descriptions of corresponding methods will also be provided in connection with FIG. 4.

FIG. 1 is a block diagram of an example system 100 for segment clock gating. System 100 corresponds to a computing device, such as a desktop computer, a laptop computer, a server, a tablet device, a mobile device, a smartphone, a wearable device, an augmented reality device, a virtual reality device, a network device, and/or an electronic device. As illustrated in FIG. 1, system 100 includes one or more memory devices, such as memory 120. Memory 120 generally represents any type or form of volatile or non-volatile storage device or medium capable of storing data and/or computer-readable instructions. Examples of memory 120 include, without limitation, Random Access Memory (RAM), Read Only Memory (ROM), flash memory, Hard Disk Drives (HDDs), Solid-State Drives (SSDs), optical disk drives, caches, variations, or combinations of one or more of the same, and/or any other suitable storage memory.

As illustrated in FIG. 1, example system 100 includes one or more physical processors, such as processor 110. Processor 110 generally represents any type or form of hardware-implemented processing unit capable of interpreting and/or executing computer-readable instructions. In some examples, processor 110 accesses and/or modifies data and/or instructions stored in memory 120. Examples of processor 110 include, without limitation, chiplets (e.g., smaller and in some examples more specialized processing units that can coordinate as a single chip), microprocessors, microcontrollers, Central Processing Units (CPUs), graphics processing units (GPUs), Field-Programmable Gate Arrays (FPGAs) that implement softcore processors, Application-Specific Integrated Circuits (ASICs), systems on chip (SoCs), digital signal processors (DSPs), Neural Network Engines (NNEs), accelerators, graphics processing units (GPUs), portions of one or more of the same, variations or combinations of one or more of the same, and/or any other suitable physical processor.

As further illustrated in FIG. 1, processor 110 includes a control circuit 112, a clock tree 114, a segment 134 including a circuit block 116, and a clock driver 132. Control circuit 112 corresponds to circuitry and/or instructions for managing at least some aspects of power management and/or a power delivery network 140, such as power gate circuit circuits that can selectively provide or block power delivery. As described herein, control circuit 112 can also be configured to manage at least some aspects of powering on and off clock driver 132. Clock tree 114 corresponds to a circuit for providing a clock signal to various components (e.g., circuit block 116 and other components of system 100). Segment 134 corresponds to a hierarchy of components, which can correspond to a coarse gating hierarchy as will be explained further below. Circuit block 116 corresponds to one or more components coupled to clock tree 114, for example corresponding to logic components, data components, etc., and/or portions thereof. Clock driver 132 corresponds to a driver circuit (e.g., circuits that provide sufficient output current to drive a signal over a distance) for amplifying or otherwise propagating a signal, such as the clock signal of clock tree 114.

In some examples, clock tree 114 corresponds to a segment of a clock tree of system 100 that propagates the clock signal driven by clock driver 132 to segment 134 (and/or circuit block 116). In other words, clock driver 132 and clock tree 114 can be organized with segment 134 as part of a hierarchy for segment clock gating, as further described herein.

FIG. 1 further illustrates power delivery network 140 which corresponds to circuits for delivering power to various components of system 100. In some examples, power delivery network 140 can include power gate circuits coupled to circuit block 116. Control circuit 112 can control certain aspects of power delivery network 140, such as the power gate circuits that can be arranged in a coarse gating hierarchy, as described further below.

Figure 2A:
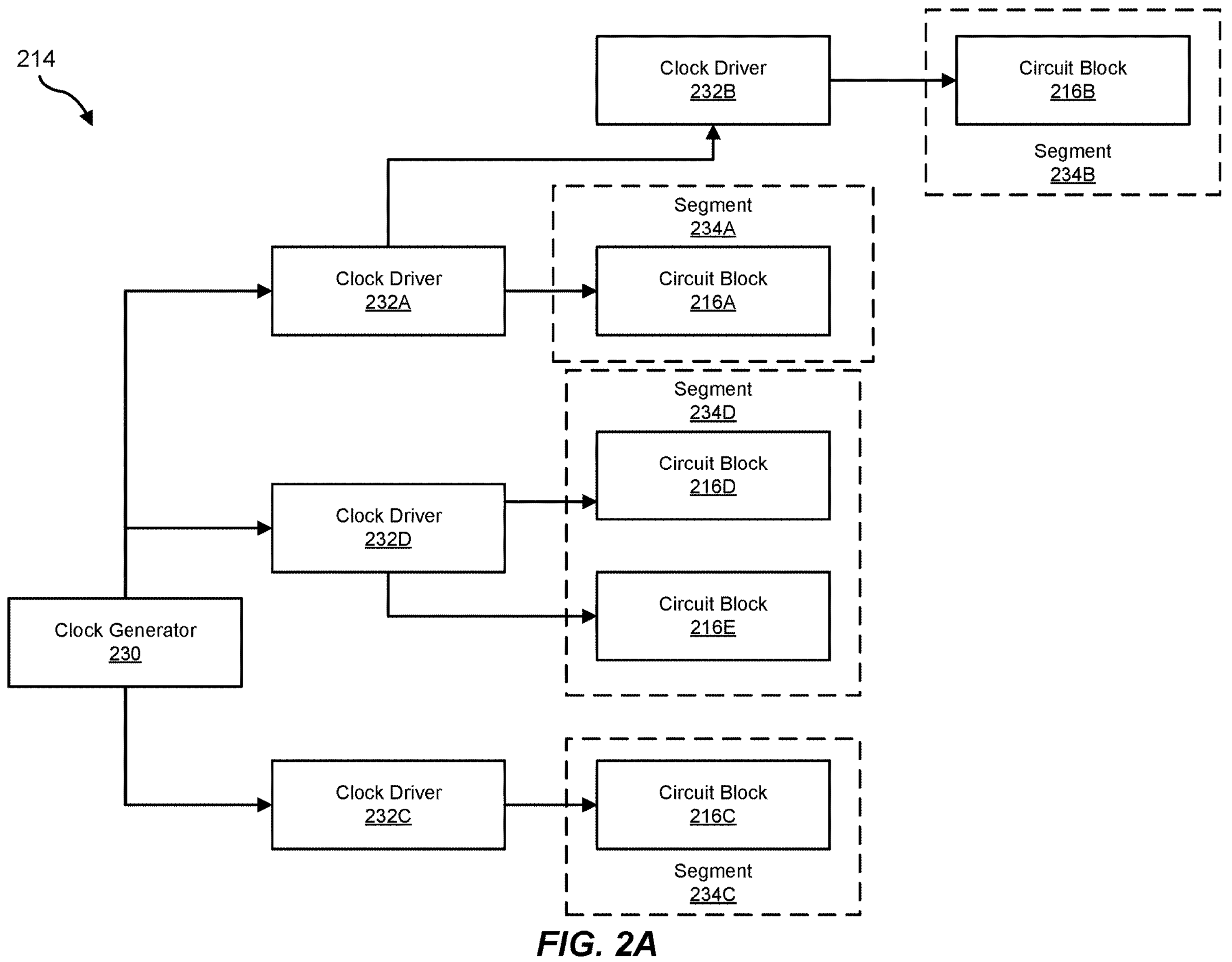
FIGS. 2A-B are block diagrams of an exemplary clock tree and segment layouts that can be segment clock gated.

FIG. 2A illustrates a clock tree 214 corresponding to an iteration of clock tree 114 that includes a clock generator 230. Clock generator 230 corresponds to a clock circuit, such as an oscillator circuit, for generating a clock signal that can be propagated to various components, such as a circuit block 216A, a circuit block 216B, a circuit block 216C, a circuit block 216D, and a circuit block 216E, each of which corresponding to iterations of circuit block 116. In some iterations, clock generator 230 can correspond to a free running clock that is not phase locked to or is otherwise independent of other clock sources. FIG. 2 illustrates a simplified clock tree architecture that, in other examples, can include more branches, components, connections, etc.

Based on an architecture/arrangement of the various circuit blocks, the clock signal from clock generator 230 can be propagated or driven by clock drivers. As illustrated in FIG. 2, a clock driver 232A drives the clock signal to circuit block 216A as well as to a clock driver 232B that drives the clock signal to circuit block 216B, a clock driver 232D that drives the clock signal to circuit block 216D and circuit block 216E, and a clock driver 232C that drives the clock signal to circuit block 216C. Each of clock drivers 232A-232D can correspond to iterations of clock driver 132.

As described herein, a control circuit or power management controller (e.g., control circuit 112) can selectively power gate components as part of a power management policy, such as entering a low power state. For example, the control circuit can power gate circuit block 216C in response to and/or deciding on a power gate event such as entering the low power state. However, as described herein, even with power gating circuit block 216C, corresponding portions of clock tree 214, which includes clock driver 232C, can unnecessarily consume power for instance by driving the clock signal. Because circuit block 216C is power gated, circuit block 216C does not require the clock signal. Accordingly, in some examples, clock driver 232C itself can be safely powered off to realize additional power savings.

However, due to a complexity of clock tree 214 as well as corresponding circuit blocks, powering off a corresponding clock driver (which can power off the corresponding portion of clock tree 214) in response to power gating a circuit block can in some instances be untenable or otherwise produce undesirable results. For example, if circuit block 216D is power gated (and circuit block 216E remains powered on), powering off corresponding clock driver 232D can disrupt operation of circuit block 216E. In another example, powering off clock driver 232A while clock driver 232B is still powered on (e.g., before clock driver 232B is powered off) can disrupt operation of clock driver 232B.

Clock tree 214 can be organized into various segments, such as a segment 234A, a segment 234B, a segment 234C, and a segment 234D based on a hierarchy of clock tree 214. Each segment can include portions of clock tree 214, including local clock mesh and links, etc., as well as other components (e.g., logic components, memory components, etc.) not illustrated in FIG. 2A. Each segment can further correspond to one or more circuit blocks (e.g., segment 234B corresponding to circuit block 216B, segment 234A corresponding to circuit block 216A, segment 234D corresponding to circuit block 216D and circuit block 216E, and segment 234C corresponding to circuit block 216C) such that each segment provides the clock signal to its corresponding circuit block.

As further illustrated in FIG. 2A, the segments can be organized in a segment hierarchy, which in some examples, can correspond to or otherwise align with a coarse gating hierarchy. Certain segments can depend on (e.g., must be turned on with, and can receive signals from or otherwise branch off from) other segments. For example, segment 234B can depend on segment 234A (e.g. segment 234B can receive data signals from segment 234A and clock driver 232B for segment 234B receives a clock signal from clock driver 232A for segment 234A). In addition, as segment 234A drives signals to both circuit block 216A and segment 234B (e.g., by way of clock driver 232B), segment 234A can be more on as it cannot be safely power gated unless both circuit block 216A and segment 234B are power gated. In some examples, clock generator 230 can be located near a root of the coarse gate circuit hierarchy (e.g., a power management controller), or can be driven to this root for further clock tree propagation. In one example, the hierarchy can include a first shell of a least gated region (e.g., a display logic), followed by a next shell (e.g., multimedia logic), followed by additional shells, including other common logic. A last shell can include individual processor complex gate circuits that can be most gated.

Figure 3:
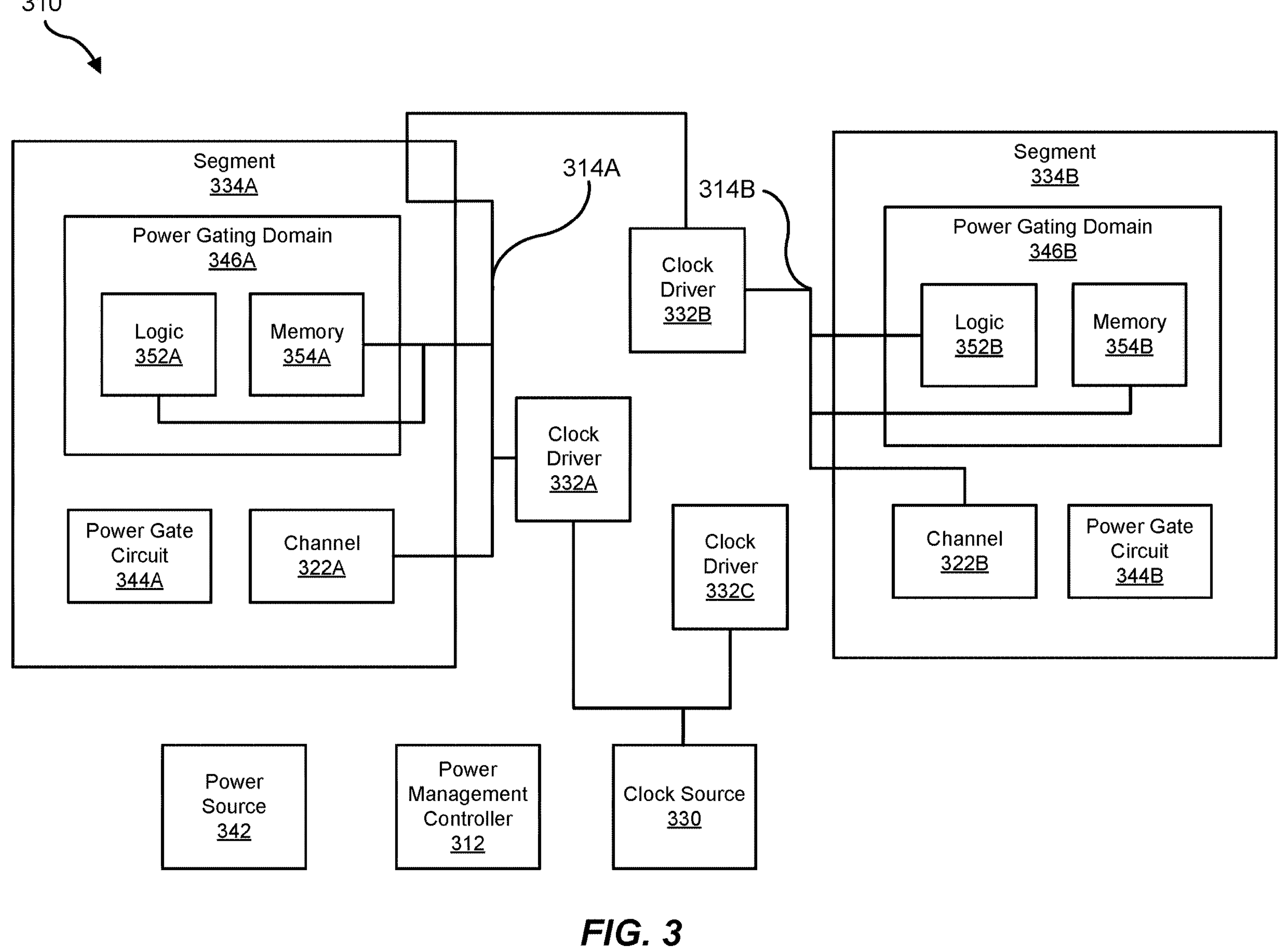
FIG. 3 is a block diagram of an exemplary power delivery network for segment clock gating.

In another example, the hierarchy can include multiple branches from a single root which form non-overlapping shells of coarse gate circuits (see, also, FIG. 3). By arranging the branches of clock tree 214 to match the coarse gate circuit hierarchy, the coarse gate circuits driven from the control circuit and propagated along this hierarchy from tile to tile can be consumed at the edge of a less-gated coarse gate circuit domain in a less-gated segment (e.g., segment 234A) to control the clock drivers (e.g., clock driver 232B) of a more-gated segment (e.g., segment 234B) corresponding to a more-gated coarse gate circuit domain. In some examples, a less-gated segment or domain can correspond to a segment/domain having more branches and/or dependencies (e.g., closer to a root) and a more-gated segment can correspond to a segment/domain having less branches and/or dependencies (e.g., further from the root or closer to a leaf of the hierarchy). Accordingly, the control circuit can implement one set of interfaces for both segment (e.g., portions of clock tree 214) and coarse (e.g., local clock mesh, logic, and memory) gating, as segment clock gating can be incrementally done at hierarchical boundary crossings (for example powering off clock driver 232B at a hierarchical boundary between segment 234A and segment 234B). The control circuit can account for the additional delays incurred by clock driver power up/down and by the clock tree to stop or resume and removes the control circuit's reliance on any free running signals. In some implementations, the segments and coarse gate circuits can be controlled separately, which can require separate sequencing and wait dependencies.

Thus, the control circuit can prevent powering off clock drivers (e.g., segment clock gating) for segments until all of its dependencies are segment clock gated (e.g., powering off clock driver 232A after all of segment 234A, segment 234B, and clock driver 232B are powered off). By organizing clock tree 214 into segments based on hierarchy, the control circuit can maintain a sequence (e.g., from most-gated segment to least-gated segment) of segment clock gating segments based on the hierarchy of dependency (e.g., segment clock gating segment 234B before segment clock gating segment 234A) and power on the segments in a reverse sequence (e.g., powering on segment 234A before powering on segment 234B).

Figure 2B:
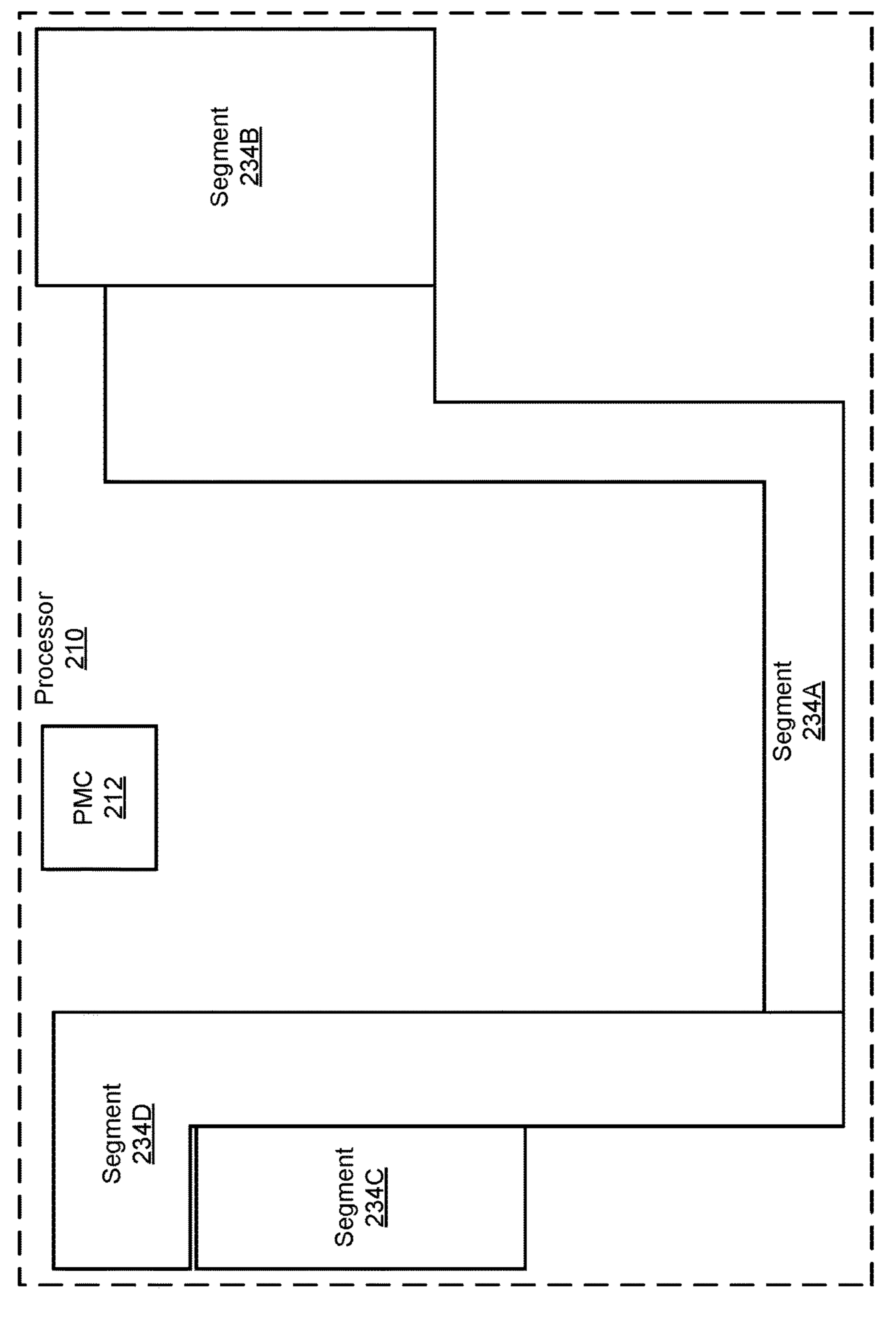

FIG. 2B illustrates a system 200 corresponding to system 100, and including a processor 210 corresponding to processor 110. FIG. 2B illustrates an example layout of the segments in FIG. 2A. For example, FIG. 2B illustrates segment 234A and segment 234B that depends on segment 234A. FIG. 2B further illustrates segment 234D and segment 234C. In other examples, segments can be organized in other layouts. FIG. 2B also includes a power management controller (PMC) 212, corresponding to control circuit 112.

In one example, a wakeup event can come from a neighboring component (e.g., chiplet, client, processing component, etc.) of segment 234C (e.g., a component in segment 234D) that implements an interface with logic inside segment 234C. PMC 212 can listen to all wakeup events. When a free running clock (e.g., not belonging to coarse gated local meshes in logic or channel tiles) is available (e.g., without segment clock gating), the wakeup event can normally travel to PMC 212. With segment clock gating as described herein, the wakeup events can instead asynchronously propagate in segments without using re-timers, because the clock is no longer available due to the segment clock gating. In some implementations, this asynchronous wakeup can then be synchronized using synchronizer flops once it arrives in PMC 212. PMC 212 can be upstream to the clock drivers of the segments that can be powered off (see, also FIG. 3) and therefor remains clocked.

In some examples, multiple components can signal different wakeup events to PMC 212 such that multiple wakeup events can be sent asynchronously to respective target segments (e.g., logically OR'ed in a daisy chained or other topology in logic or channel tiles that can otherwise be segment clock gated) or otherwise combined. In some examples, there can be multiple wakeup events from multiple neighboring components that can include display controllers, multimedia controllers, other processors, graphics controllers, and/or I/O controllers. A wakeup signal from the display controller can be used to partially power up a fabric with only necessary segments exiting gating. For example, when the display controller or other stutter client (e.g., a processing component capable of entering a stutter mode in which its memory fabric can be idle while it exhausts a previously-filled buffer) is close to exhausting its buffer, PMC 212 can receive and send wakeup events (e.g., asynchronously without waiting to collect all wakeup events) to the fabric for the display controller to access memory as well as logic components that service the display controller can be powered on, while other components (e.g., additional interfaces, crossbars, links, probe filters, shadow tag management components of other caches that have been flushed, private caches of other clients, and other components not used by the stutter client) can remain powered down. A wakeup signal from the multimedia controller can be used for a second partial power up. Wakeup signal by other components can be used for other partial (e.g., targeting particular segments and/or components) or full power up (e.g., targeting all or nearly all segments and/or components controlled by PMC 212).

Individual wakeup events can be used to enter partial or full power up states by powering up only segments needed by the type of the wakeup event, so that PMC 212 can initiate more precise partial/full power up actions (e.g., exiting segment clock gating and exiting power gating of segments/components) that can maximize power savings for the wakeup scenario upon seeing the respective asynchronous wakeup event rather than having to gather all neighbor wakeup events into a single asynchronous wakeup, exit power gating in all segments, and wait for the proper synchronous wakeup event to propagate in the powered on segment, before making the partial power up decision.

FIG. 3 illustrates a simplified architecture and more specifically a clock tree of a die 310 corresponding to an iteration of processor 110. Die 310 includes a power source 342, corresponding to a circuit coupled to a power source (e.g., battery, plug to another power source, etc.), along with a power management controller (PMC) 312 (corresponding to control circuit 112), a clock source 330 (corresponding to clock generator 230), a clock driver 332A (corresponding to an iteration of clock driver 132), a clock driver 332B (corresponding to an iteration of clock driver 132), and a clock driver 332C (corresponding to yet another iteration of clock driver 132). Clock driver 332A drives a clock tree 314A (corresponding to an iteration of clock tree 114) and clock driver 332B drives a clock tree 314B (corresponding to an iteration of clock tree 114). Although not illustrated in FIG. 3, clock driver 332C can also drive a clock tree portion.

As illustrated in FIG. 3, die 310 includes various segments and circuit blocks, such as a segment 334A corresponding to segment 234A and/or another segment, and a segment 334B corresponding to segment 234B and/or another segment. Segment 334A includes a power gate circuit 344A, a power gating domain 346A, and a channel 322A (e.g., corresponding to a memory channel and/or other fabric component). Segment 334B includes a power gate circuit 344B, a power gating domain 346B, and a channel 322B (e.g., corresponding to a memory channel and/or other fabric component).

The various power gate circuits can power gate their respective power gating domains and components therein. For example, power gate circuit 344A can power gate power gating domain 346A that includes components such as a logic 352A (e.g., corresponding to one or more logic circuits) and a memory 354A (e.g., corresponding to one or more memory devices for storing data, such as a register). Similarly, power gate circuit 344B can power gate power gating domain 346B that includes components such as a logic 352B (e.g., corresponding to one or more logic circuits) and a memory 354B (e.g., corresponding to one or more memory devices for storing data, such as a register).

As further illustrated in FIG. 3, clock driver 332A drives a clock signal from clock source 330 to clock tree 314A, which provides the clock signal to segment 334A, including power gating domain 346A (e.g., logic 352A and memory 354A) and channel 322A. Clock driver 332A further drives the clock signal to clock driver 332B, such that clock driver 332B is dependent on clock driver 332A, and similarly segment 334B is dependent on segment 334A. In other words, the clock tree (e.g., clock tree 314A) is routed through segment 334A to segment 334B (by way of clock driver 332B) such that clock driver 332B is more gated (e.g., with respect to the hierarchy of dependency) and clock driver 332A is less gated. Clock driver 332B drives the clock signal from clock driver 332A to clock tree 314B, which provides the clock signal to segment 334B, including power gating domain 346B (e.g., logic 352B and memory 354B) and channel 322B. Clock driver 332C also drives the clock signal from clock source 330. Clock driver 332C (and a corresponding segment, not illustrated in FIG. 3) is independent from clock driver 332A.

Although control interfaces are not illustrated in FIG. 3, power management controller 312 can control powering on/off various components. For example, power management controller 312 can power on/off clock drivers (e.g., clock driver 332A, clock driver 332B, and/or clock driver 332C) for segment clock gating of segments (e.g., segment 334A) and dependent segments (e.g., segment 334B), as described herein. Further, PMC 312 can power on/off power gate circuits (e.g., power gate circuit 344A and/or power gate circuit 344B) to power gate power gating domains (e.g., power gating domain 346A and/or power gating domain 346B). In some examples, PMC 312 can power gate logic and memory components (e.g., logic 352A, memory 354A, logic 352B, and/or memory 354B) independently of any segment clock gating of the same logic and memory components. In other words, logic and memory components can be power gated and segment clock gated, power gated without being segment clock gated, segment clock gated without being power gated, or neither power gated nor segment clock gated.

During a power gating transition (e.g., entering/exiting power gating), a running clock can be used to resolve metastability (e.g., an unstable state during which signals can lie between logic low and high levels) in the power gated region while its voltage is between off and operational levels. Because the clock drivers (e.g., clock driver 332A, clock driver 332B, and/or clock driver 332C) and the power gate circuits (e.g., power gate circuit 344A and power gate circuit 344B) are separate components, as illustrated in FIG. 3, PMC 312 can sequence the exiting of power gating of any segments containing components to be transitioned to or from power gating (e.g., in response to a wakeup event such as a temporary exit, a full power on, and/or a partial power on). In some examples, PMC 312 can force a temporary exit from segment clock gating (e.g., temporarily exiting stutter mode, servicing an interrupt, etc.). The temporary exit can include sequencing multiple segments (e.g., segment 334A and segment 334B), restoring coarse gated clock in the tiles (e.g., logic 352A, memory 354A, and local clock mesh of clock tree 314A, and/or logic 352B, memory 354B, and local clock mesh of clock tree 314B) by powering on clock drivers (e.g., clock driver 332A and/or clock driver 332B), waiting for the clock tree (e.g., clock tree 314A and/or clock tree 314B) to resume in the segment (e.g., segment 334A and/or segment 334B) and local mesh in tile to be powered on. In one example, the temporary exit sequence (which can be similar to a full exit sequence and/or correspond to a reverse entry sequence) can include powering on clock driver 332A, waiting for clock tree 314A to restore coarse gated clock in logic 352A and memory 354A, exit power gating in logic 352A and memory 354A, powering on clock driver 332B, waiting for clock tree 314B to restore coarse gated clock in logic 352B and memory 354B, and powering on (e.g., exiting power gating of) logic 352B and memory 354B, in accordance with segment dependency. In another example, the exit sequence can include powering on clock driver 332A, powering on clock driver 332B, wait for clock tree 314A and clock tree 314B to restore coarse gated clock in the logic and memory of both corresponding segments (e.g., logic 352A and memory 354A of segment 334A and logic 352B and memory 354B of segment 334B), and exiting power gating in the segments (e.g., power gating domain 346A corresponding to segment 334A and power gating domain 346B corresponding to segment 334B) in any order or in parallel.

After the temporary exit condition elapses (e.g., re-entering stutter mode, completing the interrupt, etc.), a low power state reentry sequencing can include signaling a power gate circuit (e.g., power gate circuit 344A and/or power gate circuit 344B) to re-enter power gating, re-enabling tile coarse clock gating, and waiting for tiles to finish gating and the clock drivers to reenter segment clock gating. In one example, a reenter sequence (which can correspond to a reverse of the exit sequence) can include power gating segment 334B (e.g., power gating domain 346B), segment clock gating segment 334B (e.g., powering off clock driver 332B), and power gating and segment clock gating segment 334A, in accordance with segment dependency. Thus, PMC 312 can manage power gating transition reset. In another example, the reenter sequence can include power gating segment 334A (e.g., power gating domain 346A) and segment 334B (e.g., power gating domain 346B) in any order or in parallel in the respective segments, segment clock gating segment 334B (e.g., by powering off clock driver 332B), followed by segment clock gating segment 334A (e.g., by powering off clock driver 332A).

Alternatively, in some examples, the temporary exit condition can upgrade to a full exit condition (e.g., to a full and/or partial power on), such that the exit sequence can proceed as described herein, without re-entry into segment clock gating and/or power gating of segments. In some examples, when the wakeup event corresponds to a partial power state, PMC 312 can perform the exit sequence for the target components of the partial power state while keeping other components power gated/powered off. For instance, for a partial power state targeting logic 352A, segment 334B can be kept power gated and clock driver 332B can be kept powered off, while clock driver 332A is powered on and logic 352A and/or memory 354A is exited from power gating. However, in some examples if the partial power state targets logic 352B, clock driver 332A can be powered on (e.g., based on the hierarchy) to enable clock driver 332B such that segment 334B can exit segment clock gating.

In some examples, the sequencing described above can be used to temporarily restore the clock to service individual register access to registers physically located in segments, and then return to segment clock gating once the access is complete (e.g., the temporary exit and temporary exit condition corresponds to the register access). For example, for a register in segment 334A, PMC 312 can power on clock driver 332A, wait for clock tree 314A to resume in segment 334A, and exit power gating for power gate circuit 344A to allow servicing the register. Then, PMC 312 can power off/gate power gate circuit 344A, wait for power gating domain 346A to finish gating, and power off clock driver 332A to return to segment clock gating.

Figure 4:
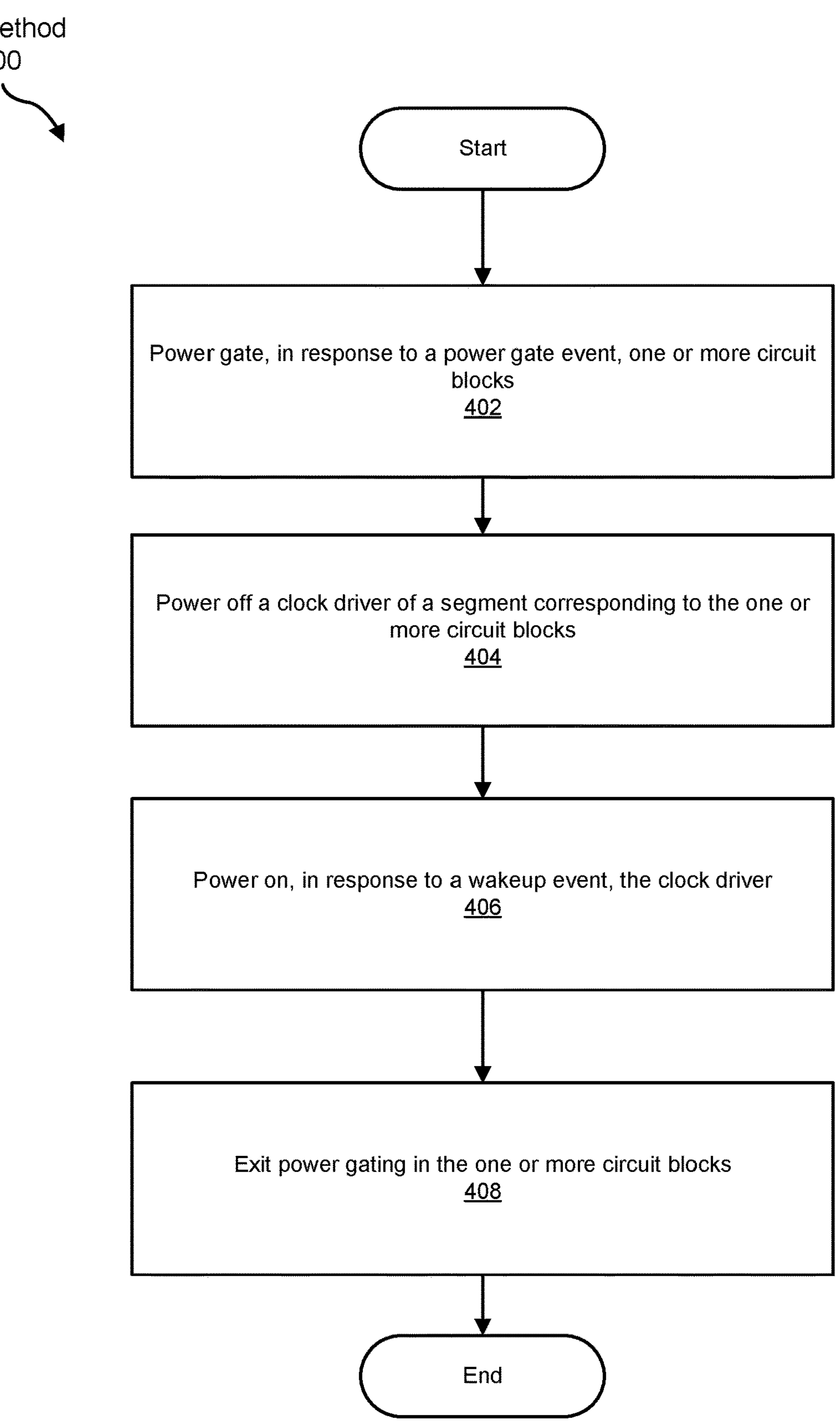
FIG. 4 is a flow diagram of an exemplary method for segment clock gating.

FIG. 4 is a flow diagram of an exemplary method 400 for segment clock gating. The steps shown in FIG. 4 can be performed by any suitable circuit and/or system, including the system(s) illustrated in FIGS. 1, 2, and/or 3. In one example, each of the steps shown in FIG. 4 represent an algorithm whose structure includes and/or is represented by multiple sub-steps, examples of which will be provided in greater detail below.

As illustrated in FIG. 4, at step 402 one or more of the systems described herein power gate, in response to a power gate event, one or more circuit blocks. For example, control circuit 112 can, in response to circuit block 116 and/or segment 134 being targeted for a power gate event, power gate segment 134.

The systems described herein can perform step 404 in a variety of ways. In one example, the power gate event can be propagated from a second segment that is less gated than segment 134.

At step 404 one or more of the systems described herein power off a clock driver of a segment corresponding to the one or more circuit blocks. For example, control circuit 112 can power off clock driver 132 corresponding to segment 134 (e.g., driving clock tree 114 to segment 134 and/or circuit block 116) to segment clock gate corresponding segment 134.

At step 406 one or more of the systems described herein power on, in response to a wakeup event targeting the one or more circuit blocks, the clock driver. For example, control circuit 112 can power on clock driver 132.

The systems described herein can perform step 406 in a variety of ways. In one example, the wakeup event can be propagated from the second segment that is less gated than segment 134.

At step 408 one or more of the systems described herein exit power gating in the one or more circuit blocks. For example, control circuit 112 can exit power gating of segment 134.

The systems described herein can perform step 408 in a variety of ways. In one example, exiting power gating of segment 134 further includes waiting for a clock signal (as propagated through clock tree 114) driven by clock driver 132 to resume (e.g., in response to powering on clock driver 132 at step 406) before exiting power gating of segment 134, to allow circuit block 116 to power in with a clock signal.

As detailed above, even when a processing architecture implements efficient coarse clock gating inside logic components with near zero flops on a free running clock, a significant portion of idle power can come from SOC clock tree distribution. In other words, coarse clock gating leads to reduced power consumption, but can still lead to idle power consumption from the clock tree drivers. The clock tree drivers are designed for large loads and therefore can draw significant power. Simply turning off the entire clock tree itself would result in no free running clock, which can provide challenges for powering back on the logic components. Segment clock gating, as detailed above, can further power off the clock tree drivers.

The systems and methods described herein provide a mechanism in which the multiple scenario-based coarse gate circuits often used in designs for various low/partial power schemes (e.g., stutter mode phases which certain processors can buffer data so as to have low activity while the buffer is exhausted, non-stutter low power state logic, per-CPU complex off, or last level cache situational enable, etc.) can also be used to construct gate-able segments which further turn off the clock tree used for logic components belonging to these coarse gate circuits. The effect of a gated segment clock can be thought of as clock gating the free running clock, which presents many challenges.

The systems and methods described herein provide a sequence to turn off the segment after coarse gating and turn it on to propagate free running logic such as clock gate circuit, reset, etc. before ungating (e.g., exiting power gating of the segment). Also provided is a mechanism to create hierarchical segments where a more-on segment can be created in series to a less-on segment, along with sequencing for power up or down one or more serial segments. Further provided is a temporary pulse enablement for isolated events like register access or power gating transition reset while logic components in the segment remain idle. Also provided is creation of scenario based asynchronous wakeup to allow precise segments to exit gating for the trigger event.

Accordingly, the systems and methods described herein allow for improved clock gating to further reduce power consumption. Because a completely disabled clock tree would not be able to properly power on components, the systems and methods provided herein provides various features to overcome this problem and further allows asynchronous wake up of components, based on grouping.

As detailed above, the circuits, devices, and systems described and/or illustrated herein broadly represent any type or form of computing device or system capable of executing computer-readable instructions, such as those contained within the modules described herein. In their most basic configuration, these computing device(s) each include at least one memory device and at least one physical processor.

In some examples, the term "memory device" generally refers to any type or form of volatile or non-volatile storage device or medium capable of storing data and/or computer-readable instructions. In one example, a memory device stores, loads, and/or maintains one or more of the modules and/or circuits described herein. Examples of memory devices include, without limitation, Random Access Memory (RAM), Read Only Memory (ROM), flash memory, Hard Disk Drives (HDDs), Solid-State Drives (SSDs), optical disk drives, caches, variations, or combinations of one or more of the same, or any other suitable storage memory.

In some examples, the term "physical processor" generally refers to any type or form of hardware-implemented processing unit capable of interpreting and/or executing computer-readable instructions. In one example, a physical processor accesses and/or modifies one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), systems on a chip (SoCs), digital signal processors (DSPs), Neural Network Engines (NNEs), accelerators, graphics processing units (GPUs), portions of one or more of the same, variations or combinations of one or more of the same, or any other suitable physical processor.

In some implementations, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein are shown or discussed in a particular order, these steps do not necessarily need to be performed in the order illustrated or discussed. The various exemplary methods described and/or illustrated herein can also omit one or more of the steps described or illustrated herein or include additional steps in addition to those disclosed.

The preceding description has been provided to enable others skilled in the art to best utilize various aspects of the exemplary implementations disclosed herein. This exemplary description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A device comprising:
- a clock tree configured to send a clock signal to a plurality of circuit blocks;
- a clock driver for driving a portion of the clock tree, thereby providing the clock signal to one or more circuit blocks of the plurality of circuit blocks; and
- a control circuit configured to:
  - power gate the one or more circuit blocks of the plurality of circuit blocks; and
  - power off the clock driver.

2. The device of claim 1, wherein a first circuit block of the plurality of circuit blocks is power gated and the control circuit is further configured to power on the clock driver to enable the first circuit block being powered on.

3. The device of claim 2, wherein the control circuit is configured to power on the clock driver in response to a wakeup event received by the control circuit.

4. The device of claim 3, wherein the wakeup event corresponds to a second circuit block interfacing with the first circuit block.

5. The device of claim 3, wherein the wakeup event is part of a daisy chain of wakeup events from respective circuit blocks of the plurality of circuit blocks.

6. The device of claim 3, wherein the wakeup event corresponds to a temporary exit of powering off the clock driver.

7. The device of claim 6, wherein the temporary exit corresponds to a register access of the first circuit block and the control circuit is further configured to:

power on the clock driver for the register access; and power off the clock driver in response to the register access completing.

8. The device of claim 3, wherein the wakeup event corresponds to a partial power state in which the first circuit block exits power gating and the clock driver is powered on while other circuit blocks remain power gated.

9. A system comprising:

a plurality of segments each comprising circuit blocks;

a plurality of clock drivers each configured to drive a clock signal to a respective segment of the plurality of segments; and a control circuit configured to:

power gate a segment of the plurality of segments; and power off a corresponding clock driver of the plurality of clock drivers associated with the power gated segment.

10. The system of claim 9, further comprising a plurality of power gate circuits for power gating the plurality of segments.

11. The system of claim 9, wherein a hierarchy of the plurality of clock drivers corresponds to a dependency of driving the clock signal between clock drivers of the plurality of clock drivers.

12. The system of claim 11, further comprising a clock generator corresponding to a root of the hierarchy of the plurality of clock drivers.

13. The system of claim 11, wherein the hierarchy of the plurality of clock drivers corresponds to a sequence from a most-gated clock driver to a least-gated clock driver such that a less-gated clock driver is configured to drive the clock signal to a more-gated clock driver.

14. The system of claim 13, wherein the control circuit is further configured to power off one or more of the plurality of clock drivers based on the sequence.

15. The system of claim 13, wherein the control circuit is further configured to power on, in response to a wakeup event, one or more of the plurality of clock drivers based on a sequence from the least-gated clock driver to the most-gated clock driver and to exit power gating, in response to the wakeup event, of one or more of the plurality of segments based on the sequence from the least-gated clock driver to the most-gated clock driver.

16. The system of claim 9, wherein the control circuit is configured to:

receive a wakeup event that targets multiple segments of the plurality of segments; and asynchronously propagate the wakeup event to the targeted segments.

17. The system of claim 9, wherein the control circuit is configured to:

power on, in response to a wakeup event corresponding to a temporary exit, the corresponding clock driver;

exit power gating of the segment;

power gate the segment in response to a temporary exit condition elapsing; and power off the corresponding clock driver.

18. A method comprising:

power gating, in response to a power gate event, one or more circuit blocks;

powering off a clock driver that drives a segment of a clock tree providing a clock signal to the one or more circuit blocks;

powering on, in response to a wakeup event, the clock driver; and exiting power gating in the one or more circuit blocks in response to powering on the clock driver.

19. The method of claim 18, wherein exiting power gating in the one or more circuit blocks further comprises waiting for a clock signal driven by the clock driver to resume before exiting power gating in the segment.

20. The method of claim 18, wherein the wakeup event is propagated asynchronously with respect to the one or more circuit blocks.

* * * * *